July 22, 1969          R. P. FRITSCH          3,456,317

METHOD OF PRODUCING WORM ELEMENTS FOR USE IN WORM EXTRUDERS

Filed Feb. 24, 1966

INVENTOR
RUDOLF PAUL FRITSCH

BY Hame and Nydick

ATTORNEYS

United States Patent Office 3,456,317
Patented July 22, 1969

3,456,317
METHOD OF PRODUCING WORM ELEMENTS FOR USE IN WORM EXTRUDERS
Rudolf Paul Fritsch, Stuttgart-Weilimdorf, Germany, assignor to Werner & Pfleiderer, Stuttgart-Feuerbach, Germany, a company of Germany
Filed Feb. 24, 1966, Ser. No. 529,713
Claims priority, application Germany, Mar. 13, 1965, W 38,751
Int. Cl. B21k 3/04; B23k 31/02
U.S. Cl. 29—156.8                2 Claims

ABSTRACT OF THE DISCLOSURE

A method of producing a worm element of a worm type extruder by first casting from a hard and wear-resistant metal a one-piece worm element blank defining on its outside over-dimensioned worm threads and end faces and including an axial opening of a non-circular cross-section or a circular cross-section but having in its wall at least one lengthwise recess. A liner of a metal softer than the metal used for casting of the blank and capable of being machined by a cutting tool, is then welded to the inner wall of the opening covering the same including a recess, if any. Finally, the liner metal is machined to a selected cross-sectional outline by a metal cutting tool.

---

The present invention relates to a method of producing worm elements, and in particular to a method of producing worm elements of worms having highly wear-resistant threads for use in worm presses and extruders.

Presses and extruders of this kind are used for mixing or otherwise processing a great variety of materials, such as polyamides, acetates, polyolefins and polyvinyl chlorides To increase the resistance of such materials against abrasion and other wear and tear and also to increase their strength with respect to tension, pressure, bending or torsion, it is customary to admix to the materials suitable fillers, such as pigments—for instance, titanium oxides—powdered coke or glass fibers.

In addition to processing synthetic materials such as the aforementioned ones in extruders, extruders are also used to effect admixing of the fillers, homogenizing of the mixture and dispersing of the mixture. To effect such processing the extruders are often operated with a working pressure of about fifty to three hundred atmospheres, and the filler content in the material may be as high as 30 percent of the mixture. As a result, the wear and tear experienced by the worms of the extruders, and particularly in the zone in which not yet molten synthetic pulverized plastic is mixed with the filler, are extremely high. Tests have shown that, for instance, a worm made of nitriding steel may show an abrasion of as much as 8 mm. within ten to twelve hours.

There is known a method of producing a worm element for a single-worm extruder according to which method the threads proper are made of a highly wear-resistant hard steel and welded upon a single-piece worm shaft. The threads are then ground to the required profile. This method is very complex and expensive for manufacturing worm elements which have different pitches or are used as kneading means and are slid in the manner of bushings upon a shaft, to which they are keyed to transmit the torque of the shaft to the worm elements. For some purposes the aforementioned method is not useable at all.

It is further known to produce worm elements by a method according to which a thin-walled bushing or sleeve made of a comparatively soft metal in which key slots can be cut by broaching, cutting or reaming tools is jacketed by casting with a highly wear-resistant hard metal, such as Stellite. Worm elements produced in accordance with this method have several disadvantages. Due to the weakening of the thin-walled bushing by cutting a key slot into the same, the bushing is not capable of transmitting the required torque from the shaft to the jacket which constitutes the threaded worm element proper. It has been found that the jacket is so structurally weakened when it is ground or otherwise machined to shape, particularly in the valley portions of the threads, that it not infrequently breaks. Moreover, it has been found that the bond between the core formed by the soft metal bushing and the jacket is not strong enough to transmit the torque forces involved.

It has also been proposed to cast blanks for the worm elements in one piece made of a highly wear-resistant hard material, such as Stellite. The end faces, the threads and the cylindrical bore of such a hard blank can be readily shaped by grinding, but not the wall portions in the bore which do not have a circular cross section, such as grooves, ribs, webs, etc., and which must be provided to transmit the torque from the drive shaft of the extruder to the worm elements. As is evident, grooves, ribs, etc., within the axial bore of the worm element cannot be produced by a grinding operation, but require the use of broaching, reaming, die-slotting and similar cutting tools. Tools of this kind are generally not suitable for machining very hard metals, such as Stellite.

It is an object of the invention to provide a novel and improved method of producing worm elements of the general kind above referred to which permits the use of grinding tools for shaping the threaded and other outer surfaces of the worm elements and the use of cutting tools, such as broaching tools, for shaping the grooves, ribs, etc., in the axial bores of the worm elements.

Another object of the invention is to provide a novel and improved method of producing worm elements in which highly wear-resistant hard metal suitable for machining by grinding is used for the threads of the elements and softer material suitable for machining by cutting for the non-cylindrical parts of the elements, and in which the two materials are so strongly bonded to each other that there is no danger of a separation of the two materials by the torque forces to which the worm elements are subjected during operation.

Still another object of the invention is to provide a novel and improved method of producing worm elements in which the thread-forming highly wear-resistant hard material has a final wall thickness such that there is practically no danger of cracking of the worm elements, notwithstanding the inherent brittleness of hard materials.

A further object of the invention is to provide a novel and improved method of producing worm elements by means of which the elements can be manufactured less expensively and more rapidly than is possible with methods as heretofore known.

The afore-pointed-out objects, features and advantages and other objects, features and advantages which will be pointed out hereinafter are attained by first casting a hard and highly wear-resistant metal in the form of a one-piece blank defining on its outside over-dimensioned threads and end faces and including an axial bore having in its wall at least one lengthwise groove. A liner of a softer metal is then welded into the bore, covering the same, including the groove, which may be more or less filled with the liner material. The outside of the blank is thereupon machined to selected dimensions and configurations by grinding tools, and the groove is machined to size by suitable cutting tools, such as broaching tools. As is evident, ribs, webs, etc., can be similarly cut into the liner by the use of broaching tools, etc. Due to welding a layer of a comparatively soft metal, such as normal steel or VA steel, upon a highly wear-resistant hard material, such as Stellite, a very strong bond is obtained in the boundary layer between the two materials. The casting of Stellite or other highly wear-resistant hard material is much less expensive than bonding such material to normal steel by welding in the presence of a protective gas. Welding of normal steel or VA steel upon Stellite or a similar material is a simple and fairly inexpensive operation. Moreover, the expensive highly wear-resistant material, such as Stellite, is used in the worm element only where it is actually needed for the operation of the element.

In the accompanying drawing, several preferred embodiments of worm elements produced in accordance with the method of the invention are shown by way of illustration, and not by way of limitation.

Figure 1:
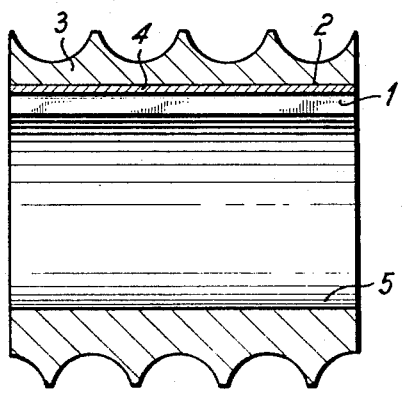
FIG. 1 is a longitudinal sectional view of a worm element having a lengthwise key slot.
Figure 2:
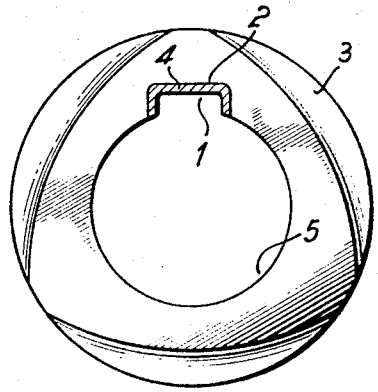
FIG. 2 is an end view of the worm element according to FIG. 1.

Referring first to FIGS. 1 and 2 in detail, the worm element according to these figures comprises a cast jacket 3 of a highly wear-resistant hard material, such as Stellite. The jacket is cast with an axial cylindrical bore 5 including a lengthwise extending groove 2. The outside of the jacket defines over-dimensioned threads and end faces. The groove 2 is covered, and if desired, more or less filled, by a liner 4 made of a softer material, such as normal steel or VA steel, and applied to the jacket wall by welding. The outside of the composite blank thus obtained, that is, the threads and the end faces, are now ground to size, and the cylindrical bore 5 is also ground to size. Finally, a key slot 1 of the desired cross section is produced by cutting liner 4 by means of a cutting tool, such as a broaching, reaming or die-slotting tool.

Figure 3:
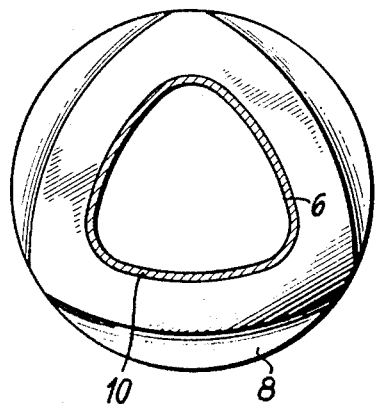
FIG. 3 is an end view of a worm element having an axial bore of polygonal cross-sectional outline.

According to FIG. 3, a jacket 8 is first cast from highly wear-resistant hard material, such as Stellite. The threads and end faces on the outside of the cast jacket are over-dimensioned, and the axial opening 10 of the jacket has the illustrated polygonal cross-sectional shape, or any other suitable non-round shape, which assures that torque will be transmitted from a drive shaft to the element proper. The entire wall of opening 10 is then lined with a liner 6 of a softer metal, such as normal steel or VA steel, bonded to the jacket by welding. Finally, the outside of the jacket is machined to size by a grinding operation, and liner 6 is machined to size by machining with a suitable cutting tool, such as a broaching tool, etc.

Figure 4:
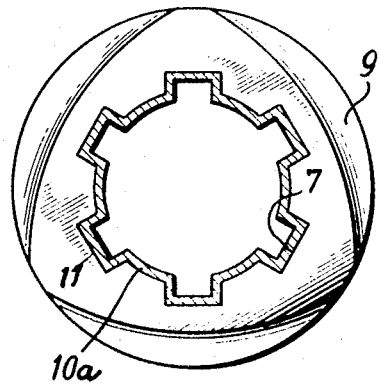
FIG. 4 is an end view of a worm element with an axial bore including several circumferentially spaced key slots.

Similarly, the worm element of FIG. 4 is produced by first casting a jacket 9 of Stellite or other suitable highly wear-resistant hard material with over-dimensioned threads and end faces and an axial cylindrical bore 10a including a plurality of circumferentially spaced grooves 11. The entire bore, including the grooves therein, is lined with a comparatively soft material 7, such as normal steel or VA steel, bonded to the jacket by welding.

The outside of the jacket is now ground to size, and the lining material in the grooves, which initially may fill the grooves more or less completely, is machined by suitable cutting tools to form the desired cross sections of multiple key slots.

While the invention has been described in detail with respect to certain now preferred examples and embodiments thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A method of producing a worm element of a worm-type extruder, said method comprising the steps of casting from a hard and wear-resistant metal a one-piece worm element blank defining on its outside over-dimensioned worm threads and end faces and including an axial opening of non-circular cross section, welding a liner of a metal softer than the metal used for casting the blank and capable of being machined by a cutting tool to the inner wall of said opening, grinding the outside of the blank to selected dimensions and configurations and machining the liner metal in said axial opening to a selected cross-sectional outline by a metal-cutting tool.

2. A method of producing a worm element of a worm-type extruder, said method comprising the steps of casting from a wear-resistant hard metal a one-piece worm element blank defining on its outside overdimensioned threads and end faces and a cylindrical axial bore having in its wall at least one lengthwise recess, lining said bore including the recess therein with a metal softer than the metal used for casting the blank and capable of being machined by a cutting tool, grinding the outside of the blank to selected dimensions and configurations, grinding the lining material on the cylindrical wall portions of said bore to a selected diameter, and cutting the lining material in said recess to a selected cross-sectional configuration by means of metal-cutting tools.

References Cited

UNITED STATES PATENTS

| | | | |
|---|---|---|---|
| 1,876,720 | 9/1932 | Merrill | 29—529 X |
| 2,126,200 | 8/1938 | Linderman. | |
| 2,618,846 | 11/1952 | Morris et al. | 29—529 X |
| 3,101,531 | 8/1963 | Roseberry | 29—481 X |
| 3,129,504 | 4/1964 | Ivan et al. | 29—529 |

PAUL M. COHEN, Primary Examiner

U.S. Cl. X.R.

29—480, 456, 528, 529